United States Patent [19]
Evans

[11] 3,849,728
[45] Nov. 19, 1974

[54] FIXED POINT PROBE CARD AND AN ASSEMBLY AND REPAIR FIXTURE THEREFOR

[75] Inventor: Arthur Evans, Brookfield Center, Conn.

[73] Assignee: Wentworth Laboratories, Inc., Brookfield, Conn.

[22] Filed: Aug. 21, 1973

[21] Appl. No.: 390,184

[52] U.S. Cl. .......... 324/158 F, 324/72.5, 324/158 P
[51] Int. Cl. .................... G01r 31/02, G01r 1/06
[58] Field of Search .......... 324/158 P, 158 F, 72.5, 324/149; 317/101 R, 101 A, 101 CC, 101 C; 339/17 C, 17 CF

[56] References Cited
UNITED STATES PATENTS
3,445,770   5/1969   Harmon ....................... 324/158 P
3,613,001  12/1971  Hostetter ...................... 324/158 P OTHER PUBLICATIONS
Solid State Technology; May 1971; page 8.

Primary Examiner—Alfred E. Smith
Assistant Examiner—Ernest F. Karlsen

[57] ABSTRACT

A probe card for testing integrated circuit patterns having contacts deployed thereon, the patterns being formed in a microelectronic substrate. The card includes an opening providing access to a pattern and a ring of spaced conductive pads surrounding the opening. Anchored on selected pads are needle-holders having needles extending therefrom to engage the contacts in the pattern being tested, all needle extensions being of the same length and all needle points lying in a common plane. In order to facilitate attachment of each needle-holder to its pad on the card and to orient the holder before such attachment so that the needle point is precisely aligned with the related contact, an assembly fixture is provided.

8 Claims, 13 Drawing Figures

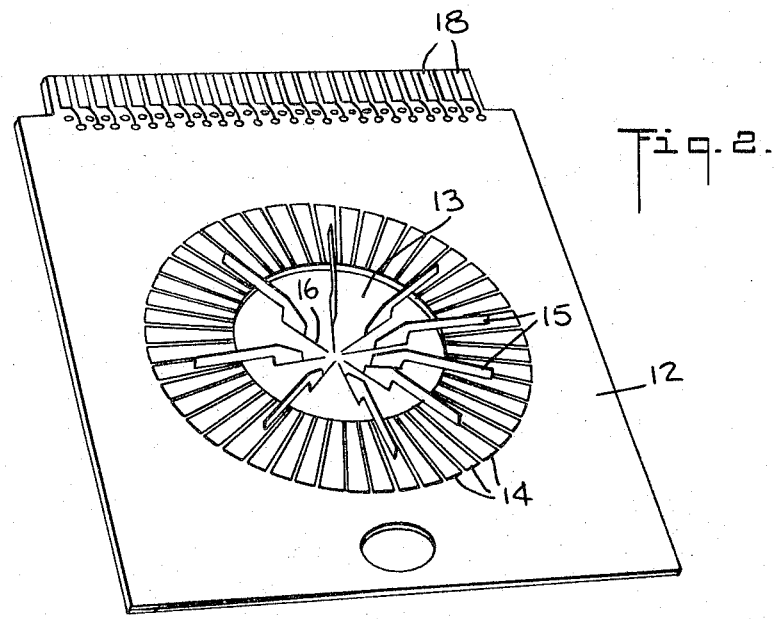
Fig. 2.
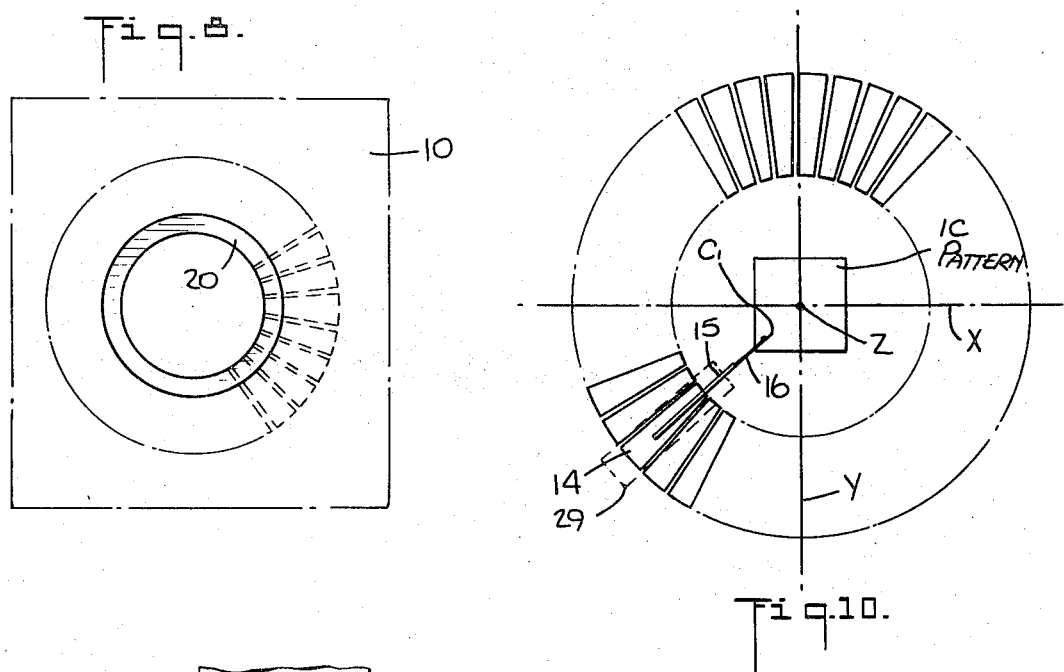
Fig. 8.
Fig. 10.
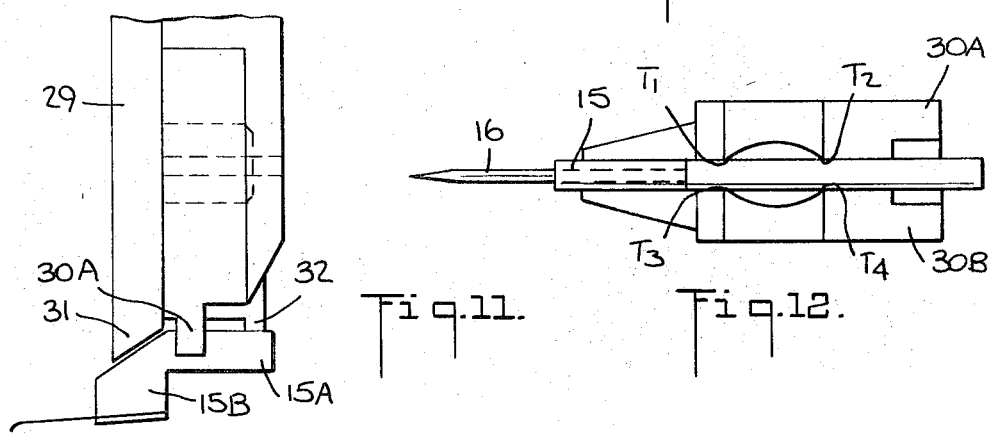
Fig. 11.
Fig. 12.

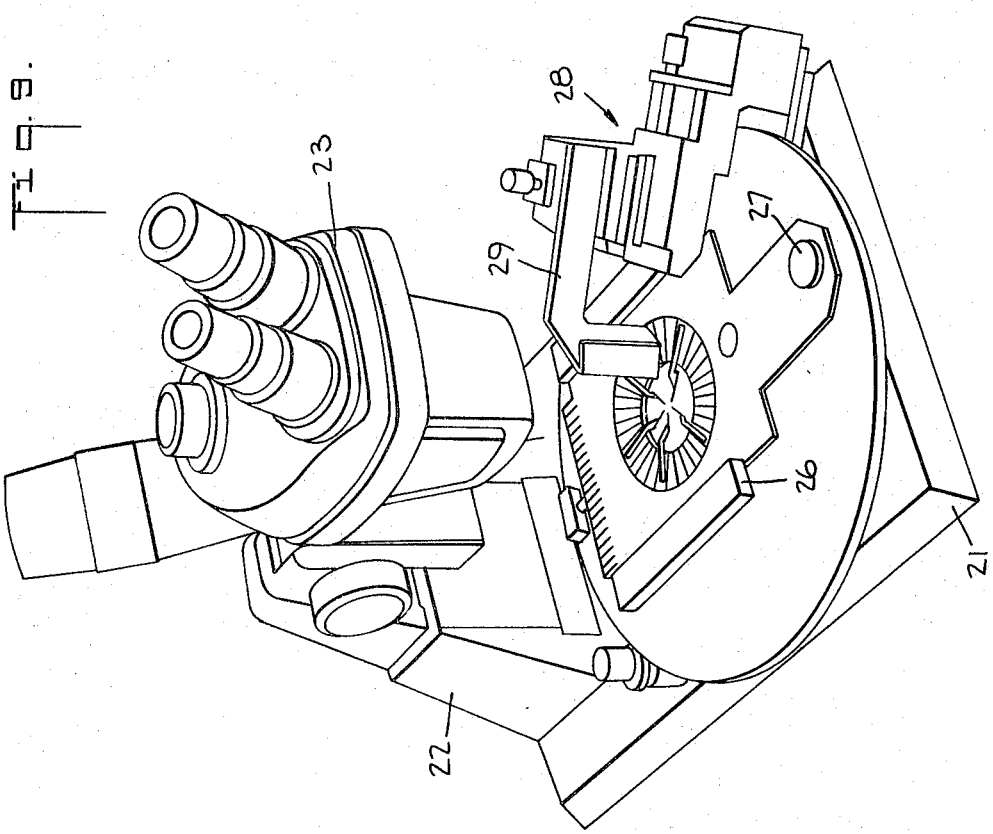
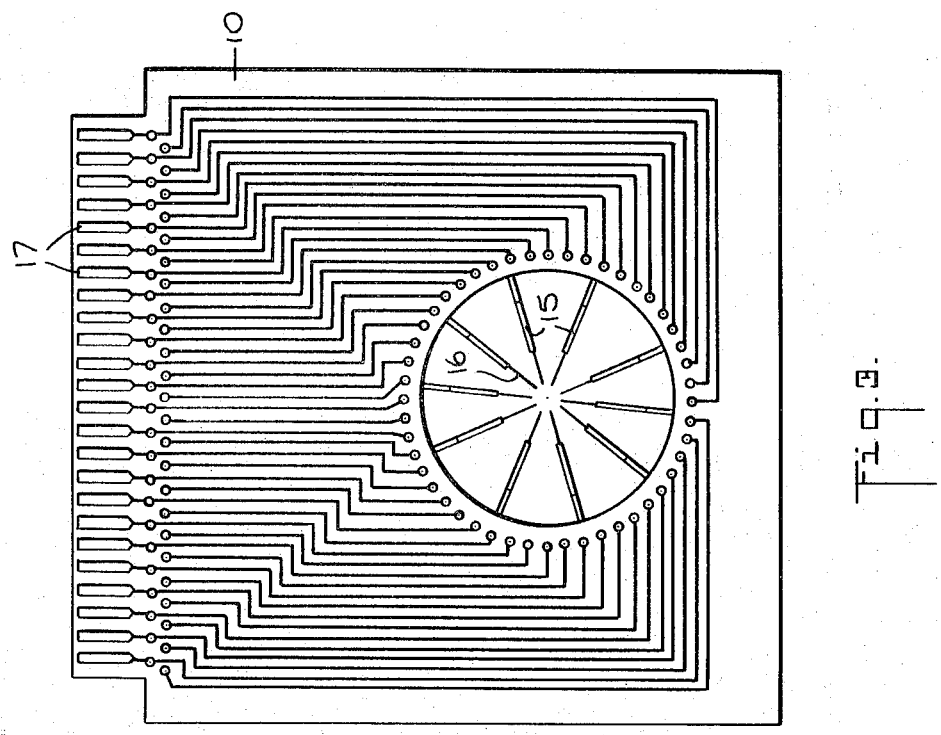

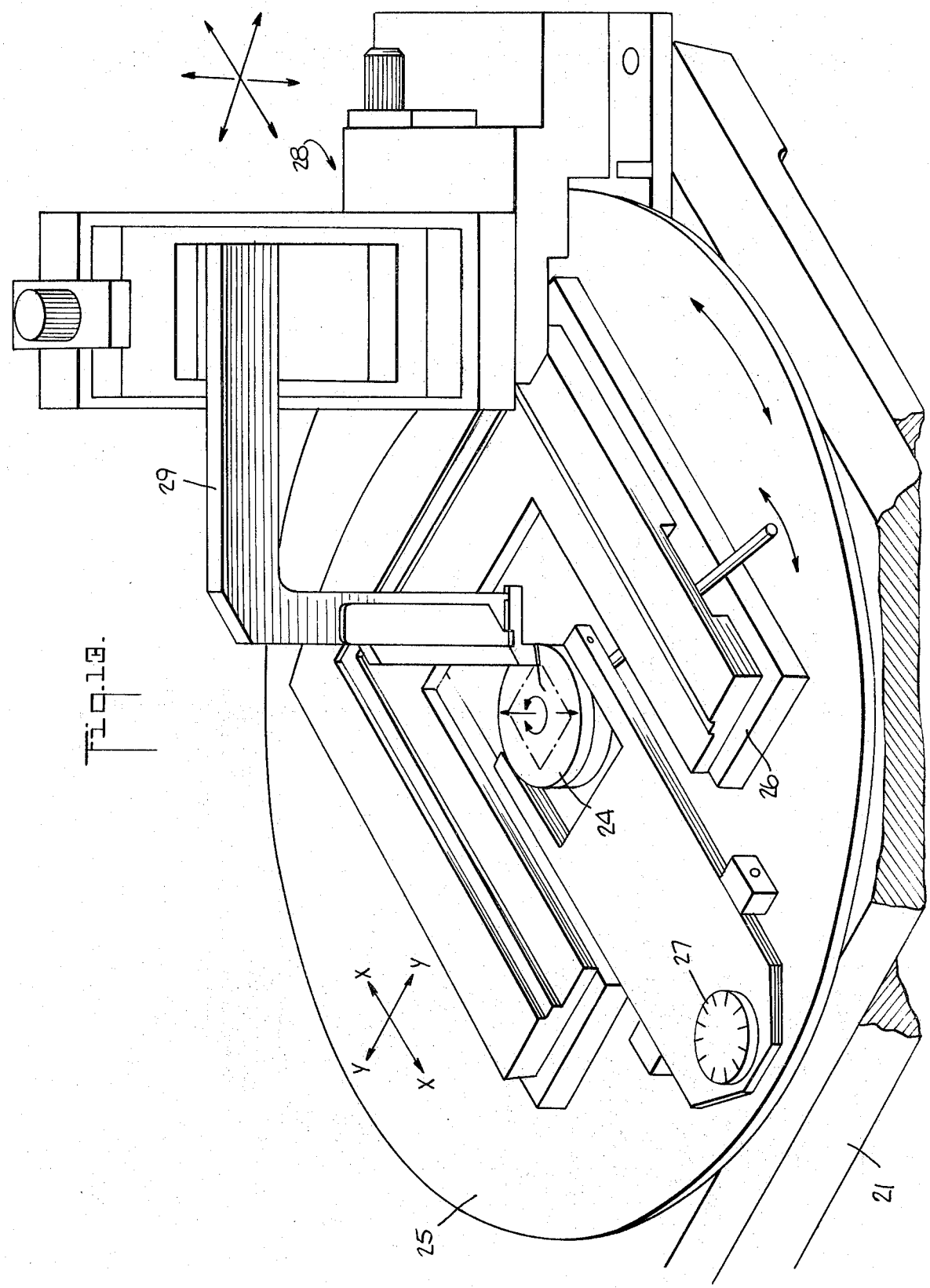

FIXED POINT PROBE CARD AND AN ASSEMBLY AND REPAIR FIXTURE THEREFOR

BACKGROUND OF THE INVENTION

This invention relates generally to the testing of integrated circuits, and, in particular, to a fixed point probe card to facilitate such tests as well as to a fixture for assembling and repairing such cards.

Many circuits and complex multi-stage electronic systems that previously were regarded as economically unfeasible and practical are now realizable with integrated circuits. The fabrication of a single-crystal monolithic circuit involves the formation of diodes, transistors, resistors and capacitors on a single microelectronic substrate. In practice, a microelectronic substrate for semiconductor integrated circuits is formed on a silicon wafer, the patterns for circuit processing being applied to the wafer by photolithography. Each wafer contains the patterns of many identical integrated circuits. After the patterns are tested, the wafer is sliced into "dice", each die containing a single circuit.

In an integrated circuit (IC) pattern, the input, output, power supply and other terminals of the circuit are formed by metallized contacts, usually deployed along the margins of the pattern. The outline of the pattern is either square or rectangular, and the marginal locations of the contact thereon depend on the circuit configuration and the available marginal space. Thus in a relatively simple circuit pattern, all of the marginal space may be available for contacts, whereas in more complex circuits, portions of the circuit may invade the marginal areas so that contact placement is restricted to the free marginal areas. In some instances, therefore, the contacts may lie in more or less uniform rows along the margins, and in other cases, the contacts may be randomly spaced from each other.

For the purpose of testing any type of integrated-circuit patterns, test probe cards have been developed and are now commercially available. Each test probe card consists of a printed circuit board having an opening to provide access to an IC pattern. The opening is surrounded by a ring of conductive pads connected by the printed circuit to card terminals for connection to test equipment appropriate to the circuit. The number of pads in the ring determine the maximum capacity of the probe card. If, for example, the card has forty-eight pads, it is capable of testing IC patterns having forty-eight contacts or less.

In setting up a probe card for a particular IC pattern, probes in the form of needles of tungsten are affixed to selected pads, the needles extending over the opening. The length and orientation of each needle is such that its point is adapted to engage a respective contact on the IC pattern.

Let us assume, by way of example, a very simple IC pattern lying within a rectangular outline and having five contacts at different marginal positions, such as two contacts adjacent on the upper and lower left corners of the rectangular and one contact adjacent to the lower right corners.

To assemble a probe card for this five contact, IC pattern, one must attach needles to those pads which are most conveniently located with respect to the contacts, and since the pattern is rectangular whereas the pads lie in a circular array, the stretch of each needle depends on the distance between its pad and the particular contact to be engaged. Hence the needles in a conventional probe card vary in length.

Since all of the contacts in the IC pattern lie in a common plane, and must be simultaneously engaged in order to carry out testing, it is essential that all needle points lie in a plane parallel to the common IC plane. Consequently, a fundamental requirement of a probe card is planarization of the needle points. The nature of conventional probe cards and the character of the assembly fixtures for setting up the probe positions for such cards are such that it is virtually impossible to assemble probes with needle points lying exactly in the same plane.

Another factor which comes into play is distortion or warpage of the printed circuit board, for this adversely affects the planarization of the probes. One expedient heretofore used to overcome these drawbacks is to provide screw-type adjustable probe arrangements which permit final setting of the probe positions. This not only adds to the cost of the card, but it also limits the number of probes one may array about the opening, for the greater the effective thickness of the probe, the smaller the number of probes that may be clustered about the opening. Also, adjusting screws have a tendency, with repeated use of the cards, to work themselves loose.

With a conventional fixed probe card having no adjustment means, the practice has been to lap or grind the points to effect planarization hereof. But this procedure dulls the points and degrades the quality of the connection effected thereby. The need for a lapping operation also adds to the cost and time involved in setting up a probe card.

Moreover, to make effective contact, the needle points must press down on the IC contacts with sufficient force to ensure a positive connection therewith. The contact force is produced by deflection of the needle. Ideally, all needle points should impose the same contact force, but because the needles are of different lengths and therefore have different deflection characteristics, some needles impose a greater force than others. An excessive contact force may result in scratching of the contact, whereas an inadequate force may result in a poor connection.

In probe cards of the type heretofore known in which the deflectable needles are anchored at one end to a pad, it is not sufficient to solder the needles to the pads, for this joint is subject to stresses produced by deflection. To reinforce this joint, it is the present practice to bond the soldered end of the needle to the pad by means of an epoxy compound.

This requirement considerably lengthens the amount of time it takes to set up the probes or to replace a particular probe. If one wishes to detach a probe from a pad in order to replace it, it is necessary to first cut off the epoxy bond before unsoldering the joint. And since it takes several hours for a fresh epoxy bond to fully cure, the time involved in completing the assembly of a probe card is substantial.

SUMMARY OF THE INVENTION

In view of the foregoing, it is the main object of this invention to provide an improved fixed probe card in which all probe needles have points lying precisely in the same plane, all needles producing the same optimum contact force whereby positive connections are made with all contacts on the IC pattern being tested without damage to the contacts.

More specifically, it is an object of the invention to provide a fixed probe card in which each probe is constituted by a rigid needle-holder which is cantilevered from a pad and a needle extending from the holder, all needle extensions having the same length and all needle points lying in a common plane, whereby the planarized needles all have the same deflection characteristics and impose the same contact force.

Yet another object of the invention is to provide a reinforced printed circuit board for a fixed point probe, which board resists warpage or distortion, whereby planarization is maintained.

Also an object of the invention is to provide an efficient fixture for quickly and accurately assembling and repairing probe-cards of the above-noted type. A salient advantage of this fixture is that it makes possible the exact orientation of the holder relative to the pad and the needle point relative to the IC contact before the holder is soldered or otherwise anchored to the pad, whereby when the holder is thereafter soldered, the probe position is properly set regardless of whether the circuit board is planar or warped.

A further object of this invention is to provide a fixture of the above-noted type which facilitates the precise positioning and attachment of probes at a rapid rate whereby an assembly operation may be completed in a fraction of the time presently required with conventional fixed probe cards, and making it possible to replace an individual probe in short order.

Briefly stated, these objects are attained in a probe card according to the invention, formed by a printed circuit board having an opening therein to provide access to an IC pattern, and a ring of conductive pads separated from each other and surrounding the opening, the pads being connected by the printed circuit to terminals by which the IC pattern may be coupled to an appropriate testing apparatus.

Cantilevered from selected pads and overlying the opening are as many probes as are necessary to effect connections with the contacts in the IC pattern, each probe being constituted by a needle-holder soldered to the pad and a deflectable needle extending therefrom and terminating in a point whose spatial position lies in registration with the related IC contact. All needle extensions have exactly the same lengths despite the fact that the distances between the several contacts and the corresponding pads on the boards are different, for the axial positions of the holders on the pads are set to compensate for these differences.

Because the holders act as rigid beams, solder is sufficient to firmly anchor the holders to the pad, for the holders are not displaced by needle stresses and there is no need for a reinforcing epoxy as with conventional cards.

To facilitate assembly and repair of the cards, a fixture is provided having a vacuum chuck for presenting a substrate or wafer containing IC patterns, and an X-Y platform mechanism for supporting the card relative to the chuck and for positioning the card with respect to an IC pattern on the wafer, the chuck being adjustable in both the theta and the z direction whereby the IC pattern may be aligned and raised or lowered relative to the opening in the card.

The fixture also includes an X-Y-Z needleholder positioning mechanism adapted to grip the holder as well as to orient the holder relative to its pad and the needle point relative to its IC contact so that the probe position may be properly set before the holder is soldered to the pad. At its set position, the holder is slightly raised relative to the pad to render its position independent of any warpage in the board.

OUTLINE OF THE DRAWING

For a better understanding of the invention as well as other objects and features thereof, reference is made to the following detailed description to be read in conjunction with the annexed drawings wherein:

FIG. 2 is a perspective view of a probe card for testing integrated circuit and thin film patterns;

FIG. 3 is a plan view of the underside of the probe card showing the printed circuit for effecting connections between the probes and the card terminals;

FIG. 8 is a modified form of printed circuit board for a probe card;

FIG. 9 is a perspective view of a probe card assembly and repair fixture in accordance with the invention;

FIG. 10 is an enlarged view of the operating table of the fixture shown in FIG. 9;

FIG. 11 is an elevational view of the gripper in the fixture for clamping the needle-holder in the positioning mechanism therefor;

FIG. 12 is a bottom view of the gripper; and

FIG. 13 is a sketch illustrating the operation of the fixture.

DESCRIPTION OF THE INVENTION

Figure 1:
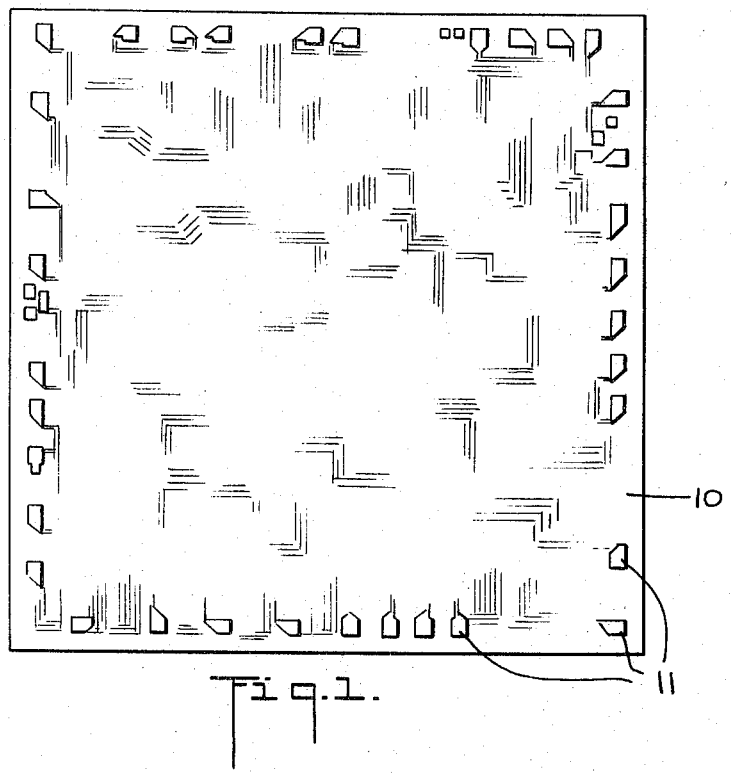
FIG. 1 is a plan view of a typical integrated circuit pattern.

Referring now to FIG. 1, there is shown, in enlarged form, a typical integrated circuit pattern 10 whose actual dimensions are 149 × 150 mils, so that the outline of the pattern is almost square. The IC pattern illustrated is a timing circuit which was integrated from a breadboard containing over a thousand discrete elements.

The contacts 11 of the IC are deployed along the four margins of the pattern, more than 30 contacts being shown. It will be seen that portions of the circuit invade the marginal zones, hence the contacts are placed only in free marginal areas. Several such patterns are fabricated on a common substrate or wafer. The manner of fabricating the wafers forms no part of the present invention.

In order to test an IC pattern of the type shown in FIG. 1 or any other type, a probe card is provided which, as illustrated in FIGS. 2 and 3, includes a printed circuit board 12 having a central opening 13, providing access to the IC pattern to be tested. Opening 13 is surrounded by a ring of equi-spaced conductive pads 14, having a wedge-shaped formation. Cantilevered from selected pads are several probes, each formed by a needle-holder 15 and a needle supported thereby. The probes overlie the opening and are so positioned that the points of the needles occupy the same place and are each in registration with an IC contact in the pattern.

In practice, the array of conductive pads surrounding the opening need not be in a circular formation as shown, nor need the pads be equi-spaced or wedge-shaped. The formation of pads is determined by the configuration of the device to be tested and in some instances, the formation of pads may be oval, generally rectangular or in other appropriate geometric forms.

The number of probes on the card and their respective orientations are determined by the number and placement of the contacts on the IC pattern to be probed. The probe card shown has a ring of 48 pads; hence the maximum capacity of this card is 48. However, if the IC pattern to be tested has, say, 25 contacts, then this card is set up with 25 probes oriented to simultaneously engage all 25 contacts.

The printed circuit or the underside of the card is arranged to connect even-numbered pads 14 to a row of 24 terminals 17 mounted along the edge of the card on the underside, and to connect odd-numbered pads to a like row of terminals 18 secured to the face of the card. Though the card shown has a maximum capacity of 48 probes, in practice the cards may be made with a smaller or larger capacity. In fact, the structure of the probes is such that the card lends itself to an exceptionally large capacity, for the probes are relatively thin and a larger number thereof may be safely crowded into a small space without danger of interference.

Figures 4, 5:
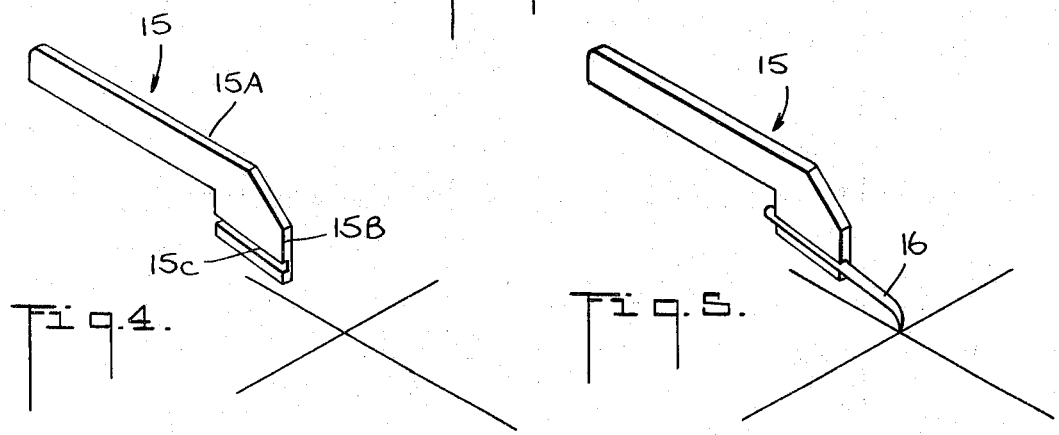
FIG. 4 is a separate perspective view of one of the needle-holders included in the probe card.
FIG. 5 shows a needle, side mounted in the holder illustrated in FIG. 4.

As shown in FIG. 4, each needle-holder is fabricated from a thin strip of metal, such as brass, which is mounted in the vertical plane, so that the resultant cantilever beam is rigid and highly resistant to deflection. The strip is contoured to define an arm 15A having at its free end a downwardly extending tooth 15B. A slot 15C is formed on one side of tooth 15B, adjacent to the bottom edge thereof, to accommodate the shank of needle 16 which is soldered to the tooth. This slotted-tooth arrangement produces an exceptionally thin probe, making it possible to set up probes in a high density arrangement.

Figures 6, 7:
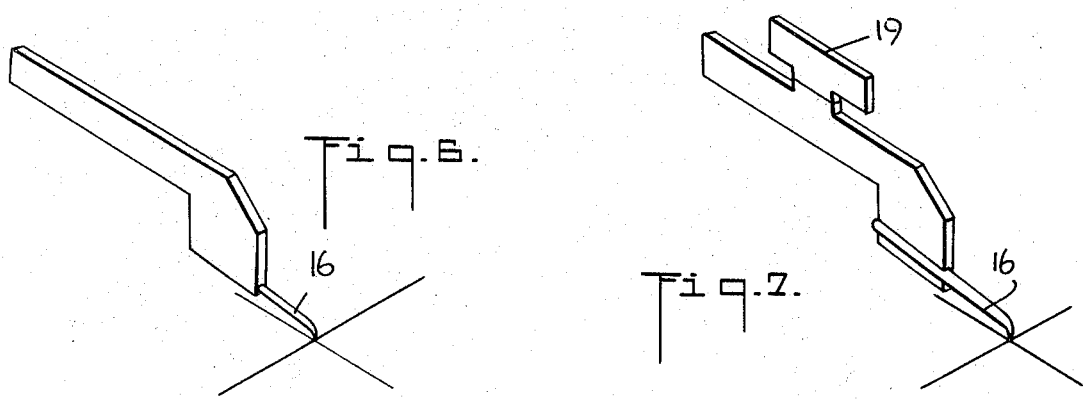
FIG. 6 shows another embodiment of a needleholder, with a needle bottom-mounted thereon.
FIG. 7 shows still another embodiment of a needle holder with a breakaway tab.

Alternatively the needle may be soldered to the bottom edge of the tooth, as shown in FIG. 6. In this instance, the holder thickness must be wide enough to accommodate the needle. In FIG. 7, the holder is shown with a break-away tab 19 to facilitate gripping of the needle by the fixture. The tab is broken off after the probe is mounted on a pad.

FIG. 8 shows only the bottom of a modified printed circuit board for a probe card, and it will be seen that a reinforcing metal washer 20 is provided to encircle the access opening and to rigidify the board to resist warping or distortions thereof which disturb planarization.

Referring now to FIGS. 9 and 10, there is shown an assembly and repair fixture serving as a station for setting up probes on probe cards in accordance with the invention. The fixture includes a base 21 having a pedestal 22 mounted thereon for supporting a microscope 23 to permit an operator to observe and thereby control the assembly or repair operation.

Mounted within an opening in the center of base 21 is a vacuum chuck 24, onto which a wafer containing several patterns is placed, the wafer being held to the chuck by a suction force. The chuck is surrounded by a rotary turntable 25 on which is supported a platform 26 adapted to receive a probe card PC to be set up. The platform is shiftable in the X and Y directions relative to the chuck by means of a suitable mechanism (not shown), and the chuck may be raised or lowered in the Z direction relative to the card by means including a control knob 27.

Fixedly mounted on platform 21 is a needle-holder X-Y-Z positioning mechanism, generally designated by numeral 28, the mechanism including an L-shaped arm 29 adapted to grip the needle-holder.

The needle-holder positioning mechanism arm 29, as shown separately in FIG. 11, includes at its free end a spring-biased clamp formed by complementary jaw elements 30A and 30B which grip the arm 15A of tthe needle-holder. The position of the holder is stabilized by a front rest 31 which abuts the inclined top edge of tooth 15B, and a backrest 32 which abuts the rear portion of the upper edge of holder arm 15A.

It will be seen that the jaws are relieved to define two pairs of teeth $T_1$, $T_2$, $T_3$ and $T_4$ directly opposite each other. These teeth resist any movement of the holder, for the teeth grip the holder firmly at spaced positions and prevent bending of the holder. The teeth also minimize physical contact with the holder to avoid a heat sink effect. The reason this avoidance of a heat sink is important is that it allows solder to flow during the soldering operation without drawing heat away from the soldering site.

The needle-holder positioning mechanism is adapted to shift the gripped holder relative to the wafer on the chuck and the pad on the printed circuit card which lies below the gripper arm, in either the X or Y direction, or in the Z direction. The details of the mechanism for effecting X and Y motion and for effecting X-Y-Z motion are not explained, for these are commonplace.

We shall now explain in connection with FIG. 13, the procedure by which a probe is brought into position with respect to a pad 14 in the ring thereof surrounding the access opening 13 so that the point of needle 16 extending from the needle-holder gripped by arm 29 of the X-Y-Z mechanism, is in registration with a particular contact of an IC pattern formed on a wafer held by the chuck.

As pointed out previously, the position of the X-Y-Z needle-holder positioning mechanism is fixed. Hence one must first, by means of the X-Y mechanism for adjusting the card position, shift the card platform 26 in the X and Y directions until the IC pattern on the wafer is centered with respect to opening 13 on the card. Then turntable 25, which carries the platform and the chuck, is turned to radially align contact $C_1$ on the IC pattern with the arm 29 on the needle-holder positioning mechanism.

The holder positioning mechanism is then adjusted in the X and Y directions so that (a) the point on needle 16 is in line in the Z direction with contact $C_1$ and (b) the longitudinal axis of the holder lies about midway along pad 14. At this junction, the holder mechanism is shifted in the Z direction to bring the lower edge of the needle-holder slightly above the pad 14. A shim or spacer may be placed between the pad and the holder to insure a predetermined slight spacing therebetween.

Then the Z mechanism for the chuck is operated to raise the wafer until contact $C_1$ on the IC pattern is engaged by the tip of needle 16 and the needle is slightly deflected to produce a predetermined optimum contact force such as 1.5 grams per mil of deflection.

Now the holder may be soldered to the pad to perpetuate the set relationships.

In the procedure described above, the operator depends on the microscope 23 to determine when the tip of the needle engages the contact. This procedure may be facilitated by means of a continuity checker operating with a light indicator, making it possible to train an operator more quickly and also speeding up the production of probe cards. The continuity checker is constituted by a lamp placed under the microscope and operating in conjunction with a low voltage supply (i.e., 10 volts). The circuit between the power supply and the lamp includes a connection between one terminal of the supply and a gripper arm which is insulated from the holder positioning mechanism, and a connection between the other terminal of the supply and the base casting of the fixture. This circuit is completed only when the needle is lowered and touches the contact on the IC device, causing the lamp to light up. Thus when the chuck is raised and the wafer makes contact with the needle, no further Z motion is necessary. If the wafer is non-conductive, a slight deflection of the needle will be noted. Now the holder may be soldered to the pad to perpetuate the set relationship.

In subsequent probe assembly operations, one does not touch the Z control of the chuck, for the first assembly operation establishes a reference for the level of the IC pattern. However, after the holder positioning mechanism is adjusted in the X and Y directions to being the needle-holder into its proper position with respect to the appropriate pad, the Z control of this mechanism is operated to bring the needle holder down toward the pad to a level slightly spaced therefrom, at which level the needle point engages its related contact. The holder is then soldered to the pad. This procedure is repeated until all contacts on the IC are provided with probes on the card.

While there have been shown and described preferred embodiments of a fixed point probe card and an assembly fixture therefor in accordance with the invention, it will be appreciated that many changes and modifications may be made therein without, however, departing from the essential spirit thereof.

I claim:

1. A fixed point probe card for testing integrated circuit patterns formed on a substrate, each pattern having contacts deployed thereon at diverse points, said card comprising:

A. a planar printed circuit board having an opening providing access to an integrated circuit pattern, said board being subject to slight warpage, B. an array of spaced conductive pads surrounding said opening, said pads being connected by said printed circuit to terminals, and C. probes cantilevered from selected pads to provide connections between said integrated circuit contacts and said terminals, each probe being constituted by a rigid needle-holder formed of a thin strip of metal lying in the vertical plane and slightly raised above a respective pad, said holder being soldered to said pad to maintain the position thereof, and a resilient needle directly attached to the holder and extending therefrom, the needle extensions of all probes being of the same lengths, the raised holders being soldered to said pads at oriented positions relative thereto whereby regardless of board warpage, the points of all needles extending from the holder lie in a common plane and are disposed to engage said contacts, the needle holders being cantilevered from their respective pads to a degree necessary to bring the points into engagement with the contacts deployed at diverse points on the pattern.

2. A probe card as set forth in claim 1, wherein said opening is reinforced by a wafer placed on the side of the card opposite the ring of pads.

3. A probe card as set forth in claim 1, wherein said printed circuit connects even-numbered pads to terminals placed on the edge of the card on one side thereof, and connects odd-numbered pads to terminals placed on the edge of the card on the other side thereof.

4. A probe card as set forth in claim 1, wherein said pads are equi-spaced and are wedge-shaped.

5. A probe card as set forth in claim 1, wherein said strip is contoured to define an arm whose lower edge is soldered to the pad, the free end of the arm terminating in a downwardly extending tooth.

6. A probe card as set forth in claim 5, wherein said tooth is provided with a slot adjacent the lower edge to accommodate the shank of the needle which is soldered thereto.

7. A probe card as set forth in claim 5, wherein the shank of said needle is soldered to the lower edge of said tooth.

8. A probe card as set forth in claim 5, wherein said arm is provided with a break-away tab.

* * * * *

UNITED STATES PATENT OFFICE
CERTIFICATE OF CORRECTION

Patent No. 3,849,728          Dated   November 19, 1974

Inventor(s)  Arthur Evans

It is certified that error appears in the above-identified patent and that said Letters Patent are hereby corrected as shown below:

Col. 1, line 61 "rectangular" should have read
-- rectangle --

Col. 6, line 14 "tthe" should have read -- the --

Signed and sealed this 11th day of March 1975.

(SEAL)
Attest:

RUTH C. MASON
Attesting OGficer

C. MARSHALL DANN
Commissioner of Patents
and Trademarks